(12) United States Patent
Sato et al.

(10) Patent No.: US 6,663,798 B2
(45) Date of Patent: Dec. 16, 2003

(54) CONDUCTIVE PASTE, OUTER ELECTRODE AND PROCESS FOR PRODUCING THE SAME

(75) Inventors: Minoru Sato, Tokyo (JP); Hiroki Yoshimura, Niigata (JP); Kenji Kobayashi, Niigata (JP); Osamu Hattori, Niigata (JP)

(73) Assignees: TDK Corporation, Toyko-to (JP); Namics Corporation, Niigata-ken (JP)

( * ) Notice: Subject to any disclaimer, the term of this patent is extended or adjusted under 35 U.S.C. 154(b) by 185 days.

(21) Appl. No.: 09/900,925

(22) Filed: Jul. 9, 2001

(65) Prior Publication Data

US 2002/0096663 A1 Jul. 25, 2002

(30) Foreign Application Priority Data

Jul. 10, 2000 (JP) ......................... 2000-208570

(51) Int. Cl.$^7$ ............................ H01B 1/22; H05K 1/09; B05D 5/12
(52) U.S. Cl. ...................... 252/512; 252/514; 174/257; 427/96
(58) Field of Search ................ 252/512, 514; 106/1.25; 174/257; 428/901; 427/96

(56) References Cited

U.S. PATENT DOCUMENTS 5,645,765 A    7/1997    Asada et al.
5,840,216 A  * 11/1998   Ohtani et al. ............... 252/514

FOREIGN PATENT DOCUMENTS

| JP | 5-342907 A | 12/1993 |
| JP | 9-132427 A | 5/1997 |
| JP | 9-208259 A | 8/1997 |
| JP | 9-306236 A | 11/1997 |
| WO | WO 95/04005 | 2/1995 |

\* cited by examiner

Primary Examiner—Mark Kopec
(74) Attorney, Agent, or Firm—Frishauf, Holtz, Goodman & Chick, P.C.

(57) ABSTRACT

The present invention provides a conductive paste for an outer electrode of an electronic part comprising glass frit, a vehicle and conductive particles, wherein the glass frit comprises (1) substantially no lead oxide; and
(2) as an oxide unit,
$B_2O_3$ in an amount of 5.0 to 30.0% by weight,
$SiO_2$ in an amount of 10.0 to 60.0% by weight and at least one oxides selected from the group consisting of BaO, ZnO, $Al_2O_3$ and $Na_2O$ wherein a content of BaO is 60.0% by weight or less, a content of ZnO is 30.0% by weight or less, a content of $Al_2O_3$ is 12.0% by weight or less and a content of $Na_2O$ is 15.0% by weight or less;

an outer electrode of an electronic part obtained by calcining the conductive paste; and a process for producing an outer electrode which comprises the step of calcining the conductive paste at a temperature of 500 to 750° C.

26 Claims, 1 Drawing Sheet

CONDUCTIVE PASTE, OUTER ELECTRODE AND PROCESS FOR PRODUCING THE SAME

BACKGROUND OF THE INVENTION

1. Field of the Invention

This invention relates to a conductive paste suitable for producing an outer electrode of an electronic part, more specifically, to a conductive paste wherein glass frit contained therein contains substantially no lead oxide that is harmful to environment. Further, this invention relates to an outer electrode of an electronic part that is obtained by calcining the above-mentioned conductive paste, a process for producing the same and an electronic part equipped with the outer electrode.

2. Prior Art

An outer electrode that is used as an terminal electrode or equipped in a surface pattern constituting a circuit in an electronic part which uses a magnetic or dielectric material as an element or in a laminated type electronic parts is formed by printing or coating a conductive paste, drying it for removing a solvent, followed by calcining. Further, for maintaining an adhesive strength between the outer electrode of the electronic part and a printed circuit board having the electrode mounted thereon, plating is carried out on a surface of the outer electrode and soldering is further conducted at the interface between the both.

Since the outer electrode is required to have a mechanical strength, the conductive paste which forms the electrode is formulated with glass frit in addition to conductive particles, resins and solvents, for the purpose of providing a mechanical strength to the electrode. In this case, when the temperature for calcining the conductive paste is high, there is a possibility of causing inner defect by melting of inner electrodes in an element. Therefore, the one with a low melting point containing a large amount of lead oxide has been conventionally used for the glass frit contained in the conductive paste for this use.

On the other hand, the use of the glass frit containing a large amount of lead oxide has a significant influence on the environment. Therefore, in terms of an environmental preservation, a conductive paste using glass frit containing substantially no lead oxide is earnestly desired.

However, if glass frit containing no lead oxide is used, an adhesive strength between the electrode and the element, the substrate, etc. is not attained, thereby creating a tendency of exfoliation of the electrode from the element or the substrate. This problem can be overcome by elevating the calcining temperature for the conductive paste, however, it causes melting of the inner electrode as mentioned above.

SUMMARY OF THE INVENTION

Accordingly, an object of the present invention is to provide a conductive paste for an outer electrode, which uses glass frit containing substantially no lead oxide, which can be calcined at a low temperature and which sufficiently provides an adhesive strength between the electrode and the element or the substrate. A further object of the present invention is to provide an outer electrode of an electronic part using the conductive paste and a process for producing the same, and to provide an electronic part using the electrode.

The present inventors have made extensive and intensive studies for solving the above problems and found a composition of glass frit satisfying the above-mentioned objects, and thus, the present invention has been completed.

Accordingly, the present invention relates to a conductive paste for an outer electrode of an electronic part comprising glass frit, a vehicle and conductive particles, wherein the glass frit comprises (1) substantially no lead oxide; and
(2) as an oxide unit,
   $B_2O_3$ in an amount of 5.0 to 30.0% by weight,
   $SiO_2$ in an amount of 10.0 to 60.0% by weight and at least one oxides selected from the group consisting of $BaO$, $ZnO$, $Al_2O_3$ and $Na_2O$ wherein a content of $BaO$ is 60.0% by weight or less, a content of $ZnO$ is 30.0% by weight or less, a content of $Al_2O_3$ is 12.0% by weight or less and a content of $Na_2O$ is 15.0% by weight or less;

The present invention further relates to an outer electrode of an electronic part which is obtained by calcining the conductive paste, to a process for producing the outer electrode of an electronic part which comprises the step of calcining the conductive paste at a temperature of 500 to 750° C. and to an electronic part equipped with the outer electrode.

DESCRIPTION OF THE PREFERRED EMBODIMENTS

Figure 1:
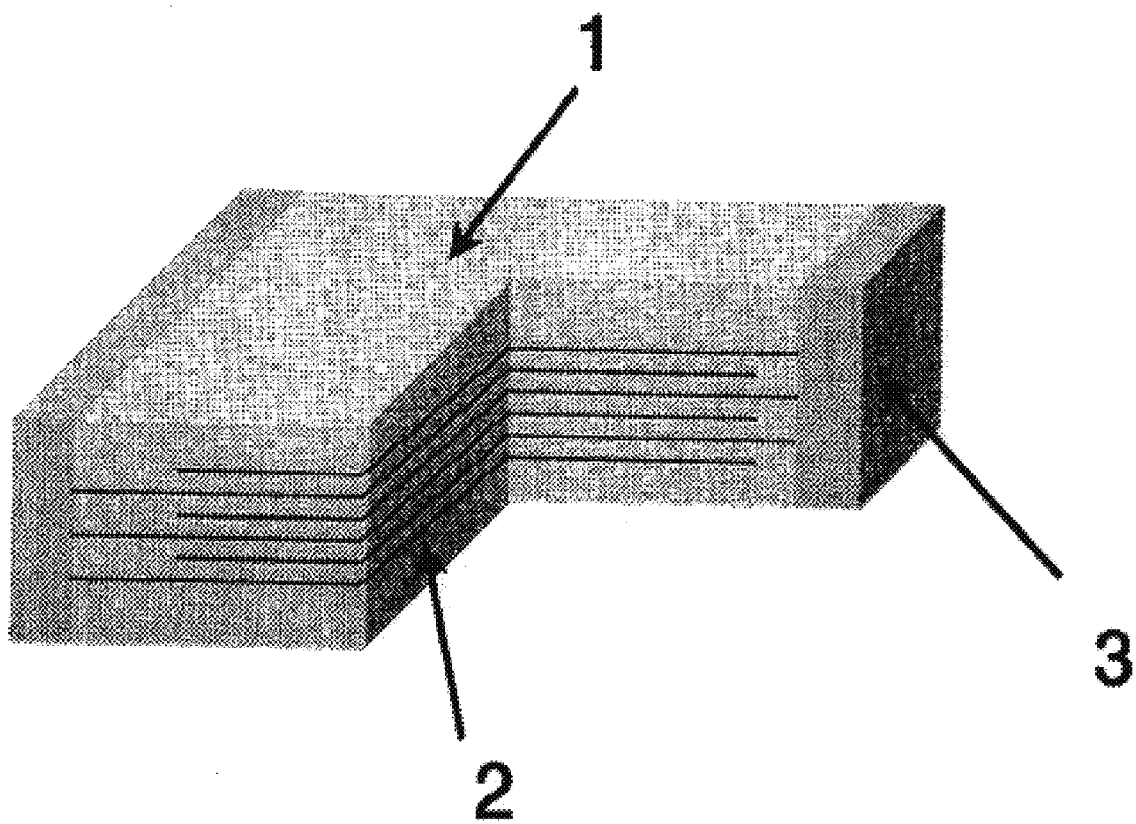
FIG. 1 is a drawing showing an example of a dielectric material wherein the reference numeral 1 is a dielectric material, 2 is an inner electrode and 3 is an outer electrode.

Hereinbelow, the present invention will be explained in more detail. The conductive paste of the present invention comprises conductive particles, glass frit and a vehicle which normally contains a resin and an organic solvent.

The conductive particles to be used in the conductive paste of the present invention is exemplified by a metal particle such as silver, copper, zinc, indium, tin, nickel, ruthenium, palladium, etc.; and an alloy particle containing the above metal(s). They may be used solely or in combination of two or more kinds. Among those conductive particles, a silver particle or a silver alloy particle is preferable since a stable and excellent conductivity is easily obtained. Especially, a silver particle is more preferable. As the silver alloy, examples include AgCu alloy, AgAu alloy, AgPd alloy, AgNi alloy, AgSn alloy and the like which contain a silver as a main component.

There is no limitation to the shape of the conductive particle allowing a spherical shape, a scale shape, a needle shape and the like. An average particle size is normally in a range of 0.05 to 30 μm since it can give an excellent surface condition after printing or coating, and an excellent conductivity to a formed electrode. More preferably, it is in a range of 0.1 to 20 μm. In this specification, the average particle diameter means an average of a particle diameter in case of a spherical shape, a major axis of a particle thin piece in case of a scale shape and a length in case of a needle shape, respectively.

A constitutional ratio of the conductive particle in the conductive paste is preferably in a range of 10 to 95% by weight, more preferably 40 to 80% by weight since the conductive paste exhibits an excellent printing property and an obtained electrode shows an excellent specific resistance.

The glass frit to be used for the conductive paste of the present invention contains substantially no lead oxide that gives a bad influence on the environment and it is a characteristic component for the present invention that has a composition with a specified range. Here, the lead oxide indicates an oxide containing lead. The conductive paste using the glass frit of such a composition can be calcined at a relatively low temperature, and a high adhesive strength can be attained between the obtained electrode and an element, a substrate, etc. In the present specification, the terms "contains substantially no lead oxide" mean that a content of the lead oxide defined above is normally less than 1.5% by weight, preferably less than 1.0% by weight. Especially preferable is a case where the content is further lowered as close to 0% by weight. Incidentally, the glass frit is normally an amorphous complex comprising oxides with a network structure and modifiers, whose composition is represented by a constitutional ratio of the oxide units in the glass frit as mentioned below.

$B_2O_3$ is contained in the glass frit in a range of 5.0 to 30.0% by weight, preferably 9.0 to 20.0% by weight.

$SiO_2$ is contained in the glass frit in a range of 10.0 to 60.0% by weight, preferably 15.0 to 60.0% by weight.

The glass frit also contains at least one oxide selected from the group consisting of BaO, ZnO, $Al_2O_3$ and $Na_2O$ The amount of BaO to be contained in the glass frit is 60.0% by weight or less, preferably 45.0% by weight or less, and more preferably in the range of 0.1 to 40.0% by weight. The amount of ZnO to be contained in the glass frit is 30.0% by weight or less, preferably 20.0% by weight or less, and more preferably in the range of 0.1 to 15.0% by weight. The amount of $Al_2O_3$ to be contained in the glass frit is 12.0% by weight or less, preferably 8.0% by weight or less, and more preferably in the range of 0.1 to 7.0% by weight. The amount of $Na_2O$ to be contained in the glass frit is 15.0% by weight or less, preferably 9.0% by weight or less, and more preferably in the range of 0.1 to 7.0% by weight.

The glass frit can be further mixed with $ZrO_2$. The amount of $ZrO_2$ to be contained in the glass frit is preferably in the range of 0.01 to 10.0% by weight, and more preferably 0.1 to 5.0% by weight.

The glass frit can be further mixed with $TiO_2$. The amount of $TiO_2$ to be contained in the glass frit is preferably in the range of 0.1 to 6.0% by weight, and more preferably 0.1 to 3.0% by weight.

As a need arises, other optional oxides excluding lead oxide can be mixed with the glass frit of the above composition in a range such that it would not impair the effect of the present invention, for example, in a total amount of 10.0% by weight or less based on the total amount of the glass frit.

Such glass frit can be produced through a conventional method, by mixing raw oxides in a way to obtain a desired oxide composition, melting the mixture and quenching it by throwing it into water, or bypassing it through a water-chilled metallic roll. If a need arises, it can be further pulverized.

The constitutional ratio of the glass frit in the conductive paste is preferably in a range of 0.1 to 30% by weight, more preferably 5 to 15% by weight since the adhesive strength is maintained between the electrode and the element, the substrate and so on.

The vehicle to be used in the present invention is generally obtained by dissolving a resin in an organic solvent. It facilitates printing or coating of the conductive paste onto an element, and it gives an excellent adhesiveness to the element until calcination is carried out.

The resin may be either thermoplastic or theremosetting. As a thermoplastic resin, preferable examples include acrylic resin, ethyl cellulose, polyester, polysulfone, phenoxy resin, polyimide and the like. As a thermosetting resin, preferred are an amino resin such as urea resin, melamine resin and guanamine resin; an epoxy resin such as bisphenol A type, bisphenol F type, phenol novolak type and alicyclic epoxy resins; an oxetane resin; and a phenol resin such as resol type and novolak type phenol resins. In case of the epoxy resin, either a self-thermosetting resin or a hardening agent or a hardening promoting agent such as amines, imidazoles, acid anhydride and an onium salt may be used and an amino resin or an phenol resin may be used to act as a hardening agent for an epoxy resin. The resin may be used solely or in combination of two or more kinds. As a resin, the thermoplastic resin is preferable since after being calcined, a little amount of residual resin or decomposition is left in the conductive layer.

The organic solvent is selected according to a kind of the resin. Examples of the organic solvent include an aromatic hydrocarbon such as toluene, xylene, mesitylene and tetralin; an ether such as tetrahydrofuran; a ketone such as methyl ethyl ketone, methyl isobutyl ketone, cyclohexanone and isophorone; a lactone such as 2-pyrrolidone and 1-methyl-2-pyrrolidone; an ether alcohol such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether and propylene glycol derivatives corresponding thereto; and a diester such as methyl ester or ethyl ester of dicarboxylic acid including malonic acid, succinic acid and the like. The organic solvent may be used solely or in combination of two or more kinds.

A constitutional ratio of the vehicle in the conductive paste is normally in a range of 5 to 90% by weight and preferably 15 to 50% by weight. An amount ratio of the resin and the organic solvent in the vehicle is optionally selected according to kinds or composition of the conductive particles, the glass frit and the resin to be used, or according to a method to be employed for printing or coating the conductive paste, and it is normally in a range of 5 to 50% by weight for the resin and 50 to 95% by weight for the organic solvent.

The conductive paste of the present invention may further contain, as a need arises, a dispersing agent, a leveling agent, a thixotropic agent, an anti-foaming agent, a silane-coupling agent and the like. As a dispersing agent, examples include an aliphatic polycarboxylic acid ester; an unsaturated fatty acid amine salt; a surfactant such as sorbitan monooleate; and a polymer compound such as polyester amine salt and polyamide. As a silane-coupling agent, examples include 3-aminopropyl-trimethoxysilane, 3-aminopropyltriethoxysilane, N-(2-aminoethyl)-3-aminopropyltrimethoxysilane, N-(2-aminoethyl)-3-aminopropylmethyldimethoxysilane, 3-mercaptopropyltrimethoxysilane, 3-chloropropyltrimethoxysilane, 3-chloropropylmethyldimethoxysilane, 3-chloropropyltriethoxysilane, 3-chloropropylmethyldiethoxysilane, 3-glycidoxypropyltrimethoxysilane, 3-glycidoxypropylmethyldimethoxysilane, 2-(3,4-epoxycyclohexyl) ethyltrimethoxysilane, etc., and it is selected according to the kinds of the conductive particle, the resin and the element or the substrate to which the outer electrode is attached.

The conductive paste of the present invention is prepared to have a proper viscosity according to a method to be employed for printing or coating on the element or the substrate. For example, when it is used in a screen-printing, an apparent viscosity of the conductive paste at room temperature is preferably in a range of 10 to 500 Pa•s, more preferably 15 to 100 Pa•s.

The conductive paste of the present invention can be prepared, for example, as follows. That is, a resin is dissolved in an organic solvent to prepare a vehicle. Conductive particles, glass frit and other component to be contained upon necessity are mixed to the vehicle, and the mixture is uniformly dispersed by a mixing means such as three rolls, a stirrer, a pot mill and a kneader to obtain a conductive paste. The temperature for preparation is not especially limited, for example, it can be prepared at room temperature.

A process for producing the outer electrode of the present invention is as follows. First, the conductive paste is printed or coated onto an object where an outer electrode is desired to be equipped, including an element such as a magnetic or dielectric material, a substrate, an electrical circuit and the like. An example of which is shown in FIG. 1 which is a schematic view of a ceramic dielectric material 1. In FIG. 1, the reference numeral 2 shows an inner electrode and 3 is an outer electrode. Printing is carried out by screen-printing, transferring, etc., and coating is carried out by using an applicator, a dispenser, etc. A thickness of printing or coating is normally such that a thickness of the outer electrode after calcination becomes 5 to 100 μm.

As a magnetic material, examples include an iron oxide; a ferrite such as cobalt ferrite, nickel ferrite, copper ferrite, zinc ferrite, barium ferrite, a ferrite of a rare earth metal, manganese ferrite, Ni—Zn ferrite, Cu—Zn ferrite, Mn—Zn ferrite, Mn—Mg ferrite, Mn—Ni ferrite and Fe—Al—Co ferrite; garnet such as yttrium-iron garnet; an alloy such as iron-nickel alloy, iron-nickel-cobalt alloy, iron-nickel-chromium alloy, cobalt-nickel alloy, copper-nickel-iron alloy, copper-nickel-cobalt alloy, vanadium-iron-cobalt alloy and nickel-manganese alloy. As a dielectric material, examples include magnesium titanate, calcium titanate, strontium titanate, barium titanate, lead titanate, calcium stannate, barium stannate, barium zirconate and solid solutions thereof, alumina and perovskite, among which barium titanate is preferable due to its excellent dielectric property. As a substrate, ceramics, alumina, etc. are exemplified.

Subsequently, the printed or coated conductive paste is dried to form a conductive layer. Drying is carried out by heating normally at 70 to 250° C. for 2 to 15 minutes.

Subsequently, the obtained conductive layer is calcined to form an outer electrode of an electronic part of the present invention.

The process for producing the outer electrode of the electronic part of the present invention is characterized in that calcination is carried out at a temperature of 500 to 750° C. preferably 600 to 670° C. in the calcination step. When the temperature for calcination is lower than 500° C. calcination would not be completely conducted, failing to obtain an electrode exhibiting a sufficient mechanical strength, and a sufficient adhesive strength to an element, a substrate, a electrical circuit, etc., or a sufficient adhesive strength when soldering is carried out onto a printed circuit board. On the other hand, when the temperature exceeds 750° C. an inner electrode is damaged causing an inner defect or a fluctuation of electrical properties.

When an element is mounted to a printed circuit board by adhering an outer electrode of the element to the substrate, plating is carried out using a metal such as nickel and tin in order to enhance an adhesive strength of the electrode obtained by calcination to the printed wiring board. Plating may be electrolytic or electroless plating, however, in plating of such an electrode, electrolytic plating is preferable due to its dimensional accuracy. Also, it is preferable to carry out double-plating using nickel and tin. Subsequently, the element is attached to the printed wiring board by carrying out soldering between the element and the board.

The electronic part of the present invention is equipped with an outer electrode of the present invention, and is exemplified by an inductor, a condenser, etc.

EXAMPLES

Hereinbelow, the present invention will be described in more detail with reference to the following Examples, which should not be construed as limiting the scope of the present invention. In these Examples and Comparative Examples, all "parts" mean "part by weight" and all "%" in composition means "% by weight".

Examples 1 to 4, Comparative Example 1 and 2

Glass frits were produced whose compositions are shown in Table 1. Note that glass frit of Comparative Example 1 has an composition outside the range of the present invention, and glass frit of Comparative Example 2 is a conventional one mainly composed of lead oxide.

TABLE 1

|  | Examples | | | | Comparative examples | |
| --- | --- | --- | --- | --- | --- | --- |
|  | 1 | 2 | 3 | 4 | 1 | 2 |
| Composition (%) | | | | | | |
| BaO | 35 | 35 | 35 | 35 | 55 | — |
| ZnO | 15 | 10 | 10 | 10 | 10 | — |
| $B_2O_3$ | 10 | 10 | 10 | 10 | 10 | 10 |
| $SiO_2$ | 30 | 32 | 22 | 30 | 15 | 30 |
| $Al_2O_3$ | 5 | 5 | 5 | 5 | 5 | — |
| $Na_2O$ | 5 | 5 | 5 | 5 | 5 | — |
| $ZrO_2$ | — | 3 | 8 | 3 | — | — |
| $TiO_2$ | — | — | 5 | 2 | — | — |
| PbO | — | — | — | — | — | 60 |

Five parts of ethyl cellulose was dissolved in 15 parts of diethylene glycol monobutyl ether to prepare a vehicle. To this vehicle were gradually added 70 parts of silver powder and 10 parts of each of the glass frit produced according to the compositions shown above while stirring. Subsequently, the mixture was mixed uniformly by passing it through a three-rolls for 3 times while gradually narrowing the intervals of the rolls at room temperature and under the same conditions, thereby preparing each of the conductive pastes.

Each of the above-obtained conductive pastes was uniformly coated on the both surface of a 2012 sized ferrite chip with an inner electrode so that a thickness after calcination became 30 μm. It was dried at 150° C. for 10 minutes followed by calcination by heating in the air in total of 60 minutes including 10 minutes at either temperature of 450° C. 650° C. or 800° C. and a time for elevating the temperature to each of the desired degree, as well as a time for cooling down to 300° C. Further, nickel plating and tin plating were conducted to form an outer electrode on the both surfaces of the ferrite chip. Here, the samples calcined at each temperature of 450° C. and 800° C. were samples for comparison.

An adhesive strength between the above-obtained outer electrode and the ferrite chip was measured according to a method described below. That is, lead wires were soldered onto the both surface of the outer electrode. One end was fixed and the other end was pulled by means of a push-pull gage, and a strength at which an exfoliation or a damage took place was measured.

In addition, an observation of a state of the electrode after calcining was done and an inner defect caused upon calcining of the conductive paste was measured by change in electrical characteristics or by observations of a sectional surface. The results are shown in Table 2.

TABLE 2

| Calcination temperature (° C.) | Item | Examples | | | | Comparative examples | |
|---|---|---|---|---|---|---|---|
| | | 1 | 2 | 3 | 4 | 1 | 2 |
| 450 | Adhesion strength (kgf) | <1.0 | <1.0 | <1.0 | <1.0 | <1.0 | <1.0 |
| | State of electrode | X | X | X | X | X | X |
| | Presence or absence of inner defect | ○ | ○ | ○ | ○ | ○ | ○ |
| 650 | Adhesion strength (kgf) | 3.8 | 4.5 | 3.5 | >5.0 | 2.8 | >5.0 |
| | State of electrode | ○ | ○ | ○ | ○ | ○ | ○ |
| | Presence or absence of inner defect | ○ | ○ | ○ | ○ | ○ | ○ |
| 800 | Adhesion strength (kgf) | 4.6 | >5.0 | >5.0 | >5.0 | 4.1 | >5.0 |
| | State of electrode | ○ | ○ | ○ | ○ | ○ | ○ |
| | Presence or absence of inner defect | X | X | X | X | X | X |

(Note) State of electrode ○: Calcination completed,
X: calcination insufficient
Presence or absence of inner defect ○: No defect,
X: there is a defect As apparent from Table 2, the outer electrode obtained by calcining the conductive paste of the present invention at 650° C. exhibited an excellent adhesive strength to the ferrite chip as the outer electrode obtained from the conductive paste of Comparative Example 2 containing the conventional glass frit with lead oxide. It was shown that the conductive paste of Example 4 using glass frit containing $ZrO_2$ and $TiO_2$ gave an outer electrode exhibiting an especially excellent adhesive strength. On the other hand, a conductive paste of Comparative Example 1 using glass frit with a composition outside the range of the present invention could not give an outer electrode with a sufficient adhesive strength. Further, in each Example and Comparative Example, when the temperature for calcination was 450° C. calcination was not completely carried out failing to give a sufficient adhesive strength. When calcined at 800° C. inner defect took place whereas an adhesive strength was excellent.

The conductive paste to form an outer electrode of an electronic part which is obtained by the present invention, has no unfavorable influence on the environment since it contains no lead oxide in glass frit. In addition, calcining can be conducted at a low temperature without causing a problem such as an inner defect due to melting of an inner electrode of an element. Further, it can give an outer electrode having a sufficient adhesive strength to an element, a substrate and so on.

Accordingly, by a process for producing an outer electrode of the present invention using the above-mentioned conductive paste and comprising the step of calcining it at 500 to 750° C. it is possible to produce an outer electrode of an electronic part having a sufficient adhesive strength and being free from the above mentioned problems.

Therefore, the conductive paste, the outer electrode and the process for producing the same of the present invention are significantly useful and meaningful since it enables to provide an electronic part equivalent to a conventional one while preserving the environment.

What is claimed is:

1. A conductive paste for an outer electrode of an electronic part comprising glass frit, a vehicle and conductive particles, wherein the glass frit comprises
   (1) substantially no lead oxide; and
   (2) as an oxide unit,
   $B_2O_3$ in an amount of 5.0 to 30.0% by weight,
   $SiO_2$ in an amount of 10.0 to 60.0% by weight,
   BaO in an amount of 0.1 to 60.0% by weight and at least one oxide selected from the group consisting of ZnO, $Al_2O_3$ and $Na_2O$ wherein a content of ZnO is 30.0% by weight or less, a content of $Al_2O_3$ is 12.0% by weight or less and a content of $Na_2O$ is 15.0% by weight or less.

2. The conductive paste according to claim 1, wherein the glass frit further comprises $ZrO_2$ in an amount of 0.01 to 10.0% by weight.

3. The conductive paste according to claim 2, wherein the glass frit further comprises $TiO_2$ in an amount of 0.01 to 6.0% by weight.

4. An outer electrode of an electronic part which is obtained by calcining the conductive paste according to claim 3.

5. An electronic part equipped with the outer electrode according to claim 4.

6. A process for producing an outer electrode of an electronic part which comprises the step of calcining the conductive paste according to claim 3 at a temperature of 500 to 750° C.

7. The process according to claim 6, wherein the calcination is carried out at a temperature of 600 to 670° C.

8. An outer electrode of an electronic part which is obtained by calcining the conductive paste according to claim 2.

9. An electronic part equipped with the outer electrode according to claim 8.

10. A process for producing an outer electrode of an electronic part which comprises the step of calcining the conductive paste according to claim 2 at a temperature of 500 to 750° C.

11. The process according to claim 10, wherein the calcination is carried out at a temperature of 600 to 670° C.

12. The conductive paste according to claim 1, wherein the glass frit further comprises $TiO_2$ in an amount of 0.01 to 6.0% by weight.

13. An outer electrode of an electronic part which is obtained by calcining the conductive paste according to claim 12.

14. An electronic part equipped with the outer electrode according to claim 13.

15. A process for producing an outer electrode of an electronic part which comprises the step of calcining the conductive paste according to claim 12 at a temperature of 500 to 750° C.

16. The process according to claim 15, wherein the calcination is carried out at a temperature of 600 to 670° C.

17. The conductive paste according to claim 1, wherein the conductive paste comprises 0.1 to 30% by weight of the glass frit, 5 to 90% by weight of a vehicle and 10 to 95% by weight of conductive particles.

18. The conductive paste according to claim 1, wherein the conductive paste comprises 5 to 15% by weight of the glass frit, 15 to 50% by weight of a vehicle and 40 to 80% by weight of conductive particles.

19. An outer electrode of an electronic part which is obtained by calcining the conductive paste according to claim 1.

20. An electronic part equipped with the outer electrode according to claim 19.

21. A process for producing an outer electrode of an electronic part which comprises the step of calcining the conductive paste according to claim 1 at a temperature of 500 to 750° C.

22. The process according to claim 21, wherein the calcination is carried out at a temperature of 600 to 670° C.

23. The conductive paste according to claim 1, wherein BaO is contained in the oxide unit in an amount of 0.1 to 40.0% by weight.

24. The conductive paste according to claim 1, wherein ZnO is contained in the oxide unit in an amount of 0.1 to 15.0% by weight.

25. The conductive paste according to claim 1, wherein $Al_2O_3$ is contained in the oxide unit in an amount of 0.1 to 7.0% by weight.

26. The conductive paste according to claim 1, wherein $Na_2O$ is contained in the oxide unit in an amount of 0.1 to 7.0% by weight.

* * * * *